United States Patent [19]

Doi

[11] Patent Number: 5,052,547

[45] Date of Patent: Oct. 1, 1991

[54] BELT MEANDERING MOTION CORRECTION DEVICE

[75] Inventor: Atsuhiro Doi, Kanagawa, Japan

[73] Assignee: Fuji Photo Film Co., Ltd., Kanagawa, Japan

[21] Appl. No.: 684,438

[22] Filed: Apr. 11, 1991

Related U.S. Application Data

[63] Continuation of Ser. No. 401,307, Aug. 31, 1989, abandoned.

[30] Foreign Application Priority Data

Sep. 1, 1988 [JP] Japan ............................... 63-218784

[51] Int. Cl.[5] ............................................ B65G 39/16

[52] U.S. Cl. .................................... 198/806; 474/111; 198/814

[58] Field of Search ................ 198/840, 823; 474/111, 474/151

[56] References Cited

U.S. PATENT DOCUMENTS

| | | | |
|---|---|---|---|
| 2,655,252 | 10/1953 | Spurgeon | 198/806 |
| 3,993,186 | 11/1976 | Sokolowski | 198/806 |
| 4,170,175 | 10/1979 | Conlon | 198/806 X |
| 4,253,343 | 3/1981 | Black et al. | 198/814 X |
| 4,547,059 | 10/1985 | Nagayama et al. | 198/806 X |

*Primary Examiner*—Joseph E. Valenza
*Assistant Examiner*—Keith Dixon
*Attorney, Agent, or Firm*—Sughrue, Mion, Zinn, Macpeak & Seas

[57] ABSTRACT

A belt meandering motion correcting device includes a belt tension enhancer for enhancing the tension of a side of the belt which undergoes a deviation, and a control roller around which the belt is wound and which allows a side portion of the belt where tension has increased to be displaced toward the downstream side in the moving direction of the belt. Accordingly, a side portion of the control roller on the side where tension has been enhanced, i.e., the side where a deviation has occurred, is displaced toward the downstream side in the moving direction of the belt, and is thereby guided in an opposite direction to the deviating direction of the belt.

8 Claims, 6 Drawing Sheets

BELT MEANDERING MOTION CORRECTION DEVICE

This is a continuation of application Ser. No. 07/401,307, filed Aug. 31, 1989, now abandoned.

BACKGROUND OF THE INVENTION

1. Field of the Invention

The present invention relates to a device for correcting the meandering motion of a belt so as to prevent a deviation of the belt wound around a rotary body such as a roller.

2. Statement of the Related Art

Conventionally, there are known conveyor belts for conveying materials to be conveyed and driving force transmitting belts that are wound around a rotary body such as a roller and adapted to transmit the rotational force of the roller.

For instance, such a belt is used in a heat development and transfer apparatus in which a light-sensitive material exposed imagewise to light is superposed on an image-receiving material, and the superposed materials are wound around an outer periphery of a heating drum. In this state, the light-sensitive material is heat developed by heating and, at the same time, the image is transferred onto the image-receiving material so as to obtain an image. In this heat development and transfer apparatus, the belt is used as a clamping and conveying means at the time when the superposed light-sensitive material and image-receiving material are wound around the outer periphery of the heating drum.

In this case, an endless belt is used as the belt and is wound around a plurality of rollers, and an outer side thereof is brought into pressure contact with the outer periphery of the heating drum. The arrangement is such that after the imagewise exposed light-sensitive material is superposed on the image-receiving material, the superposed materials are fed between the heating drum and the endless pressure-contact belt and are wound around the outer periphery of the heating drum.

The respective materials are clamped and conveyed for a predetermined time in a state in which they are superposed on each other between the endless pressure-contact belt and the heating drum heated to approximately 90° C. As a result, the light-sensitive material is heat developed, and the image formed on the light-sensitive material is transferred onto the light-receiving material.

However, with this endless pressure-contact belt, which is wound around a plurality of rollers and is brought into pressure contact with the outer periphery of the heating drum, when the belt rotatively moves together with the heating drum, a deviation of the belt from a predetermined course occurs relative to the rollers around which the belt is wound.

Consequently, at the time when the light-sensitive material and the image-receiving material are superposed and conveyed in a clamped state, an incorrect superposition can occur, which results in nonuniformity in development and transfer of the image, thereby making it difficult to obtain a desirable image.

In this case, in order to eliminate a deviation of the endless pressure-contact belt wound around the rollers, it is necessary to form the configuration and dimensions of the endless pressure-contact belt with high accuracy and accurately adjust the alignment between the rotational axes of the rollers and the heating drum, the belt winding positions, the tension of the belt, and the like. With such a method, however, since high accuracy is required, there are problems in that cost inevitably becomes high and that a lack of stability is experienced when the apparatus is used for extended periods of time.

It is conceivable to provide an arrangement in which a flange is merely formed at each opposite end of the roller around which the endless pressure-contact belt is wound, so as to forcedly prevent a deviation in the belt winding position. With this arrangement, however, there are drawbacks in that the widthwise side portion of the belt can be damaged by interference with the flange, and that the belt driving force increases or decreases intermittently, thereby rendering the conveying speed nonuniform.

SUMMARY OF THE INVENTION

Accordingly, an object of the present invention is to provide a belt meandering motion correcting device which is capable of preventing the belt wound around a rotary body such as a roller from deviating from a predetermined course with a simple construction and which does not require high accuracy adjustment, thereby overcoming the above-described drawbacks of the conventional art.

To this end, in accordance with the present invention, there is provided a belt meandering motion correcting device comprising: tension balance changing means which is adapted to apply tension to widthwise opposite side portions of the belt being moved and produce a difference between the tension of one side portion of the belt and that of the other side portion thereof when the belt deviates in a direction toward one side thereof; and a control roller which is rotated by the tension of the belt in the moving direction of the belt and is displaced in such a manner that a side thereof where tension is increased by the tension balance changing means is moved toward the downstream side in the moving direction of the belt more than the other side thereof where tension remains low.

In the belt meandering motion correcting device in accordance with the invention, when a deviation of the belt occurs in the widthwise direction thereof when the belt is moved, the meandering motion is automatically corrected.

In, other words, when the belt begins to deviate in one widthwise direction of the belt, a difference in tension is produced by the tension balance changing means between the side of the belt where the deviation has occurred and the other side of the belt where it has not. Accordingly, the control roller on the side where tension is higher is displaced toward the downstream side in the moving direction of the belt. Namely, the direction of the belt feed by the control roller rotated by the belt tension is guided in such a manner as to offset the deviating direction, thereby automatically correcting the meandering motion of the belt. Subsequently, the control roller becomes stable in a state in which the amount of meandering motion is practically nil.

Accordingly, it is not necessary to form the belt configuration and dimensions with high accuracy and adjust the alignment between rotating shafts of winding rollers and the like with high accuracy, i.e., high accuracy is not required. As a result, it is possible to reduce a reduction in cost, and the stability of the apparatus can be improved when the apparatus is used for extended periods of time.

Furthermore, since the belt does not unnecessarily interfere with the control roller and is simply rotated by tension, there are no drawbacks of the widthwise side portions of the belt becoming damaged and the belt driving force increasing or decreasing intermittently, rendering the conveying speed nonuniform.

The above and other objects, features and advantages of the present invention will become more apparent from the following detailed description of the invention when read in conjunction with the accompanying drawings.

DESCRIPTION OF THE PREFERRED EMBODIMENTS

Referring now to the accompanying drawings, a description will be given of the preferred embodiments of the present invention.

Figure 2:
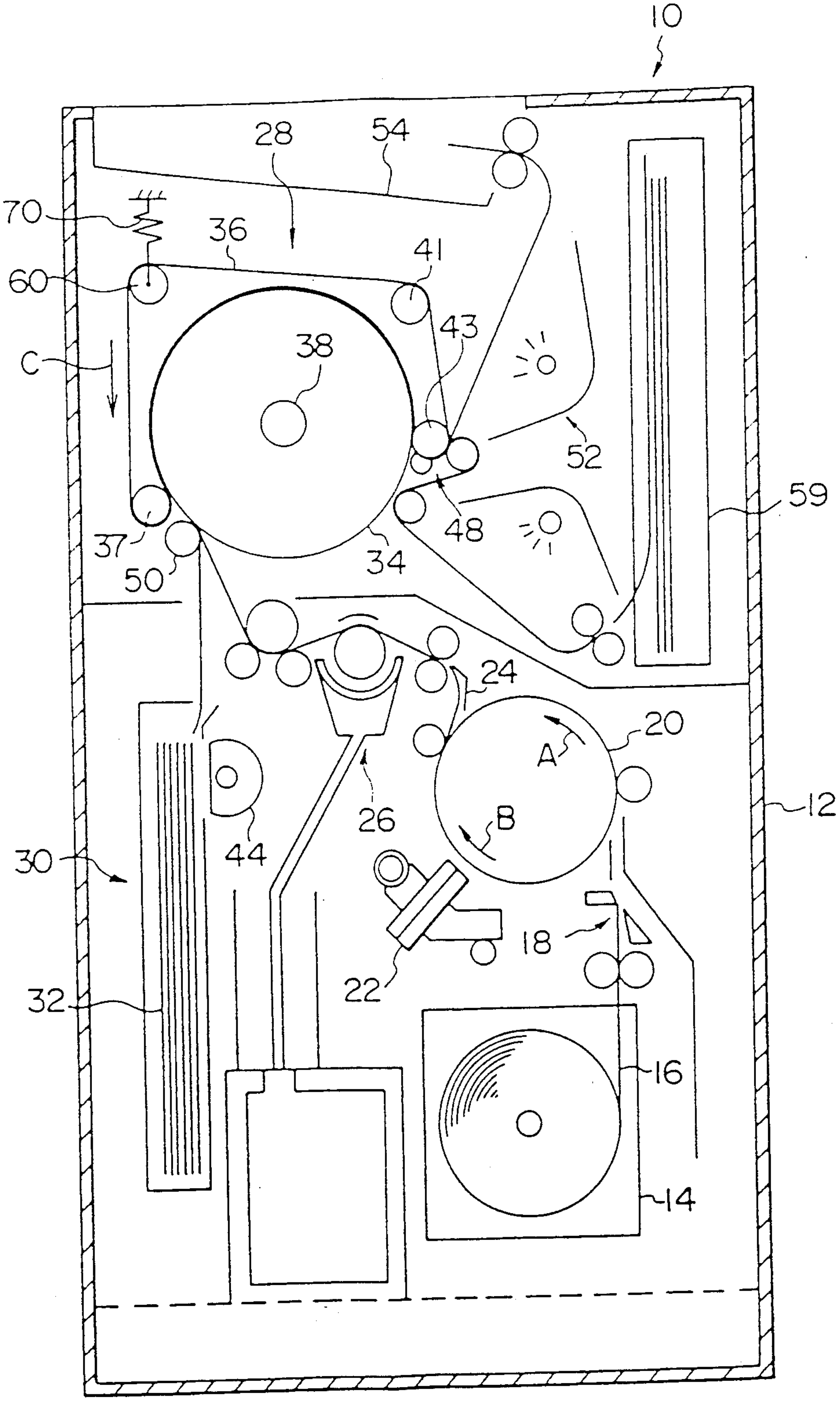
FIG. 2 is a diagram schematically illustrating an image recording apparatus to which the belt meandering motion correcting device in accordance with the present invention is applied.

FIG. 2 illustrates an image recording apparatus 10 to which a device for preventing the meandering motion of a belt in accordance with a first embodiment of the present invention is applied.

In the image recording apparatus 10, a roll type heat-developable light-sensitive material 16 is accommodated in a magazine which is, in turn, accommodated in an apparatus frame 12.

The heat-developable light-sensitive material 16 is drawn from its outer periphery, and after it is cut to a predetermined length by a cutter 18, the light-sensitive material 16 is wound around an outer periphery of a rotating drum 20. An exposure head 22 is disposed in correspondence with the outer periphery of the rotating drum 20, and as the rotating drum 20 is rotated at high speed, the heat-developable light-sensitive material 16 thus wound around is exposed imagewise to light by the exposure head 22.

As the rotating drum 20 is rotated reversely (in the direction of arrow B), the imagewise exposed heat-developable light-sensitive material 16 is scraped off the rotating drum 20 by a scraper 24, and after water serving as an image forming solvent is applied thereto in a water applying section 26, the heat-developable light-sensitive material 16 is sent to a heat development and transfer section 28.

A heating drum 34 and an endless pressure-contact belt 36 are provided in the heat development and transfer section 28. The heating drum 34 is rotatably supported by a pair of side plates 51 (shown in FIG. 1). A halogen lamp 38 is disposed inside the heating drum 34 and is adapted to heat its outer peripheral surface to approximately 90° C.

The endless pressure-contact belt 36 is wound around winding rollers 37, 41, 43 and a control roller 60 constituting a part of the belt meandering motion correcting device and also serving as a tension balance changing means, an outer side thereof being brought into pressure contact with the outer periphery of the heating drum 34. Each of the rollers is rotatably supported by the side plates 51, and the winding roller 37 is connected to an unillustrated drive motor. Consequently, as the winding roller 37 is rotated by the driving of the drive motor: the endless pressure-contact belt 36 is adapted to move in the direction of arrow C.

Figure 1:
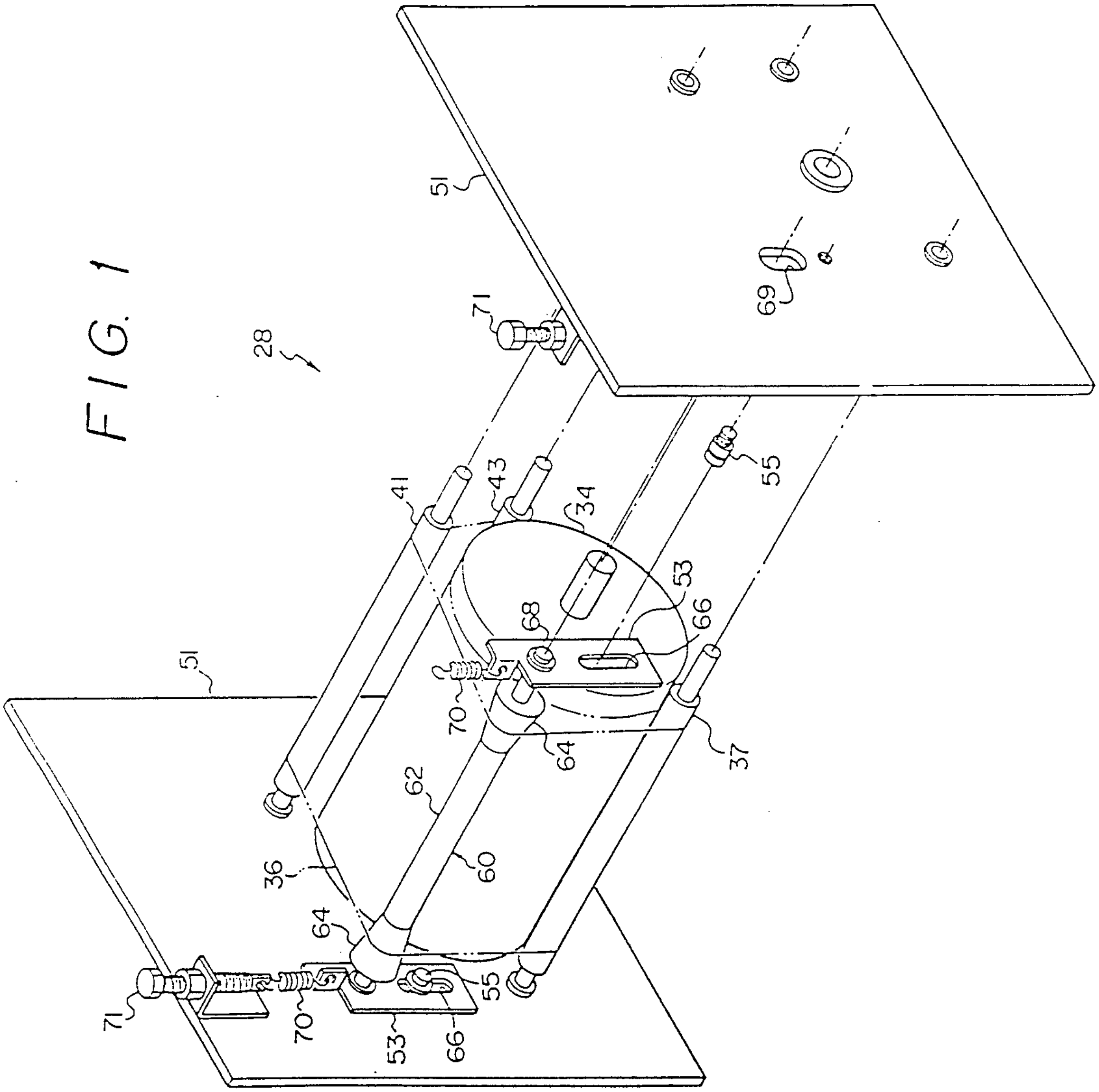
FIG. 1 is a perspective view illustrating a control roller of a belt meandering motion correcting device in accordance with a first embodiment of the present invention.

As shown in detail in FIG. 1, the control roller 60 is composed of a cylindrical central portion 62 and a pair of truncated cone-shaped side portions 64 respectively formed at the opposite ends of the central portion 62. Hence, the overall configuration of the control roller 60 is that of a spool.

The axial length of the central portion 62 is slightly shorter than the width of the endless pressure-contact, belt 36. Hence, the widthwise side portions of the endless pressure-contact belt 36 are wound around the control roller 60 in a state in which they ride up a little on the side portions 64.

As shown in FIG. 1, the control roller 60 is supported at its opposite ends by a pair of movable plates 53 which also constitute parts of the belt meandering motion correcting device The movable plates 53 have a substantially rectangular shape, and a rotating shaft 68 of the control roller 60 is rotatably supported by upper end portions of the movable plates 53.

An elongated slide hole 66 extending in the moving direction of the endless pressure-contact belt 36 is formed at a lower end portion of each of the movable plates 53. A support pin 55 secured to the side plate 51 is fitted in each slide hole 66 so as to support the control roller 60. By virtue of this arrangement, the control roller 60 is capable of moving (being displaced) with respect to the side plates 51 as the movable plates 53 respectively slide along the support pins 55.

A guide hole 69 is formed at a portion of each side plate 51 corresponding to the rotating shaft 68, and an end portion of the rotating shaft 68 is fitted loosely therein so as to restrict the moving direction of the rotating shaft 68. The guide hole 69 has an elongated configuration extending in the direction for allowing the rotating shaft 68 to move toward the downstream side in the moving direction of the endless pressure-contact belt 36.

In addition, connected to an upper end of each movable plate 53 is a tension coil spring 70 which also constitutes a part of the belt meandering motion correcting device. The tension coil springs 70 respectively constantly urge the movable plates 53 (the opposite ends of the control roller 60) in the direction in which the support pins 55 approach the lower ends of the slide holes 66 (upwardly in FIG. 1). An adjustment screw 71 is connected to each tension coil spring 70 to permit adjustment of the urging force of the tension coil spring 70.

In this case, the urging forces of the tension coil spring 70 are adjusted in such a manner as balance with the tension of the endless pressure-contact belt 36 wound around the control roller 60. Accordingly, although the rotating shaft 68 of the control roller 60 is normally located in the center of each guide hole 69 (the support pin 55 being located in the center of the slide hole 66), if the tension of either widthwise side of the endless pressure-contact belt 36 increases over that of the other side, the side portion 64 on the side where tension is increased is pressed, and the associated movable plate 53 is adapted to move along the slide hole 66 (guide hole 69) together with the rotating shaft 68 against the urging force of the tension coil spring 70.

As shown in FIG. 1, in the vicinity of the winding roller 37 around which the endless pressure-contact belt 36 is wound, a superposing roller 50 made of rubber is disposed in abutment with the outer periphery of the heating drum 34.

The heat-developable light-sensitive material 16 to which water has been applied in the water applying section 26 is fed between the heating drum 34 and the endless pressure-contact belt 36 by means of the superposing roller 50, and is conveyed in a clamped state about two thirds of the circumference of the heating drum 34.

On the other hand, a plurality of pieces of image-receiving material 32 cut to predetermined lengths are accommodated in a tray 30 disposed below the heat development and transfer section 28. These pieces of image-receiving material 32 are adapted to be taken out consecutively one by one by means of a feed roller 44 provided on a side of the tray 30. The image-receiving material 32 thus taken out is fed between the heating drum 34 and the superposing roller 50 in the heat development and transfer section 28.

The image-receiving material 32 guided to the superposing roller 50 is superposed on the heat-developable light-sensitive material 16, and the superposed materials are fed between the heating drum 34 and the endless pressure-contact belt 36.

The heat-developable light-sensitive material 16 superposed on the image-receiving material 16 is heated in the heat development and transfer section 28 and undergoes heat development and, at the same time, an image is transferred onto the image-receiving material 32, thereby forming the image on the image-receiving material 32.

A separating means 48 is disposed on a side of the heat development and transfer section 28, and is adapted to separate from each other the light-sensitive material 16 and the image-receiving material 32 fed from the heat development and transfer section 28 and to feed out these materials. The light-sensitive material 16 thus separated is fed to a disposed light-sensitive material accommodating box 59. Meanwhile, the image-receiving material 32 is dried by a drier 52 and is then fed to a discharge tray 54 formed at the top of the apparatus frame 12.

The operation of this embodiment will be described hereinunder.

After the heat-developable light-sensitive material 16 drawn out from the magazine 14 is cut by the cutter 18 and then wound around the outer periphery of the rotating drum 20, the rotating drum 20 rotates at high speed, and the heat-developable light-sensitive material 16 is exposed imagewise to light by the exposure head 22, After the exposure, the heat-developable light-sensitive material 16 is scraped off the rotating drum 20 by means of the scraper 24, water is applied thereto in the water applying section 26, and the heat-developable light-sensitive material 16 is then fed to the superposing roller 50 disposed in the heat development and transfer section 28.

Meanwhile, the pieces of image-receiving material 32 in the tray 30 are taken out consecutively one by one by means of the feed roller 44, and are fed to the superposing roller 50 of the heat development and transfer section 28.

The image-receiving material 32 thus fed to the superposing roller 50 is superposed on the heat-developable light-sensitive material 16 and is brought into close contact with each other. Furthermore, the heat-developable light-sensitive material 16 and the image-receiving material 32 thus superposed on each other by the superposing roller 50 are fed between the heating drum 34 and the endless pressure-contact belt 36 (the winding portion of the winding roller 37) and are wound around the outer periphery of the heating drum 34.

The heat-developable light sensitive material 16 and the image-receiving material 32 fed to the heat development and transfer section 28 in a state of close contact are clamped and conveyed by the endless pressure-contact belt 36 and the heating drum 34 heated to approximately 90° C. by the halogen lamp 38 about two thirds of the circumference of the heating drum 34 so as to undergo heat development, and, at the same time, an image recorded on the heat-developable light-sensitive material 16 is transferred onto the image-receiving material 32.

After transfer, the light-sensitive material 16 and the image-receiving material 32 are separated from each other by means of the separating means 48, and the light-sensitive material 16 is fed to the disposed light-sensitive material accommodating box 59, while the image-receiving material 32 is discharged to the discharge tray 54 via the drier 52.

At this juncture, as the endless pressure-contact belt 36 rotatively moves at the time of heat development and transfer processing, there are cases where a deviation of the endless pressure-contact belt 36 from a predetermined course occurs relative to the winding rollers around with the endless pressure-contact belt 36 is wound.

In this case, when the endless pressure-contact belt 36 begins to deviate from the position in which it is wound around the control roller 60, one widthwise side portion of the endless pressure contact belt 36 rides up a little on one side portion 64 of the control roller 60 formed into the shape of a truncated cone, and the tension of the belt on one of the widthwise offset sides increases over that of the other side. Accordingly, the side of the endless pressure contact belt 36 where tension is increased presses the associated side portion 64 of the control roller 60 against the urging force of the tension coil spring 70, and the movable plate 53 on the side where tension is increased moves along the slide hole 66 together with the rotating shaft 68 toward the downstream side in the moving direction of the endless pressure contact belt 36.

In other words, the winding position of the control roller 60 is displaced, and the direction of belt feed is guided in such a manner as to offset the deviating direction, so that the meandering motion of the belt can be corrected automatically. Subsequently, the control roller 60 becomes stable in a state in which the amount of meandering motion is practically nil.

Thus, in this embodiment, since the meandering motion of the endless pressure-contact belt 36 can be corrected automatically, it is possible to prevent nonuniform development and transfer caused by an incorrect superposition of the heat-developable light-sensitive material 16 and the image-receiving material 32, thereby making it possible to obtain a desirable image.

In addition, it is possible to effect a reduction in cost since it is not necessary to form the configuration and dimensions of the endless pressure-contact belt 36 with high accuracy and adjust the alignment between the winding rollers and the rotating shaft of the heating drum 34 with high accuracy, i.e., high accuracy is not required. At the same time, stability of the apparatus can be improved in cases where the apparatus is used for extended periods of time.

Furthermore, since in operation the endless pressure-contact belt 36 merely rides up gradually on the side portion 64 formed smoothly on the control roller 60, no drawbacks are encountered such as the widthwise side portions of the belt becoming damaged or the belt driving force increasing or decreasing intermittently, rendering the conveying speed nonuniform.

A description will now be given of another embodiment of the present invention. Those components that are basically identical to those of the first embodiment will be denoted by the same reference numerals, and a description thereof will be omitted.

Figure 3:
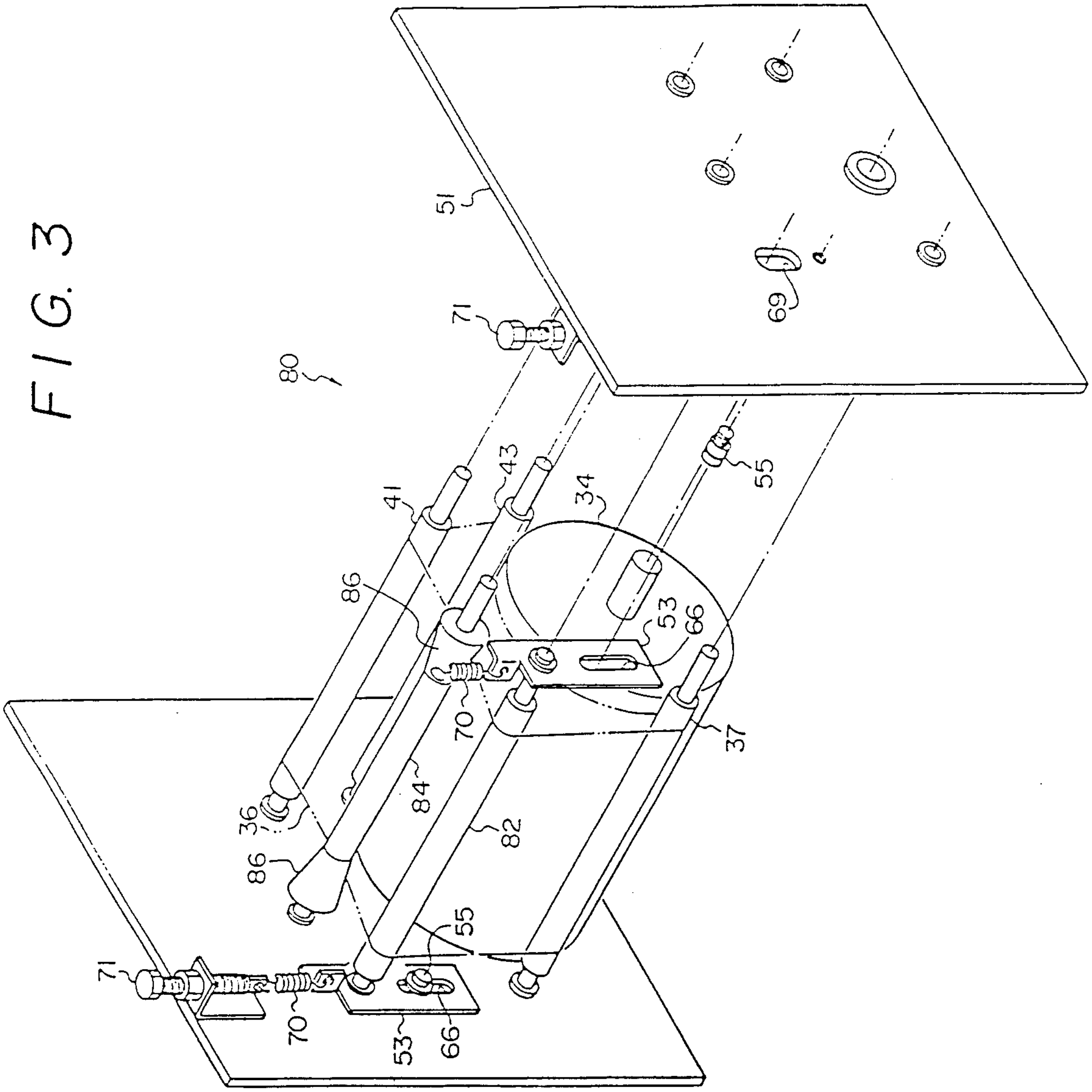
FIG. 3 is a perspective view illustrating a control roller and a tension roller of the belt meandering motion correcting device in accordance with a second embodiment of the present invention.

FIG. 3 illustrates a heat development and transfer section 80 to which a belt meandering motion correcting device in accordance with a second embodiment is applied.

The endless pressure-contact belt 36 in the heat development and transfer section 80 is wound around a control roller 82 constituting a part of the belt meandering motion correcting device. This control roller 82 has a cylindrical shape and, in the same way as the first embodiment, it is rotatably supported at its opposite ends by the pair of movable plates 53 each having the rectangular slide hole 66 (the movable plates 53 and the slide holes 66 also constituting parts of the belt meandering motion correcting device), the control roller 82 being movable together with the movable plates 53 along the slide holes 66.

In the same way as the first embodiment, the tension coil springs 70 are respectively connected to the movable plates 53 for supporting the control roller 82, and constantly urge the movable plates 53 (the opposite ends of the control roller 60) in the direction in which the support pins 55 approach the lower ends of the slide holes 66.

Meanwhile, a tension roller 84 serving as a tension balance changing means is rotatably supported between the control roller 82 and the winding roller 41. In the same way as the control roller 60 in the first embodiment, the tension roller 84 has a pair of truncated cone-shaped side portions 86 formed at the opposite ends thereof, and the overall configuration of the tension roller 84 is that of a spool. The tension roller 84 is brought into pressure contact with the outer side of the endless pressure-contact belt 36. In this case, however, a rotating shaft of the tension roller 84 merely rotates and does not move (is not displaced) unlike the control roller 82 (control roller 60).

In this embodiment as well, when the position of the endless pressure-contact belt 36 in which it is wound around the control roller 60 begins to deviate, one widthwise side portion of the endless pressure-contact belt 36 gradually rides up on the associated truncated cone-shaped side portion 86 of the tension roller 84, and the tension of one of the offset sides of the belt increases over that of the other side. For this reason, the side of the endless pressure-contact belt 36 where tension is increased presses the associated side portion of the control roller 82 against the urging force of the tension coil spring 70, and the movable plate 53 on the side where tension is increased moves along the slide hole 66 toward the downstream side in the moving direction of the endless pressure contact belt 36.

Consequently, the winding position of the control roller 82 is displaced, and the direction of belt feed is guided in such a manner as to offset the deviating direction, so that the meandering motion of the belt can be corrected automatically. Subsequently, the control roller 82 becomes stable in a state in which the amount of meandering motion is practically nil.

Thus, in this embodiment as well, the meandering motion of the endless pressure-contact belt 36 can be corrected automatically, and high accuracy adjustment can be dispensed with.

It should be noted that, in this case, the overall configuration of the tension roller 84 is not confined to that of a spool having the truncate cone-shaped side portions 86, and a similar effect can be obtained if the tension roller 84 comprises the pair of truncated cone-shaped side portions 86 alone (i.e., not provided with the central portion).

Figure 4:
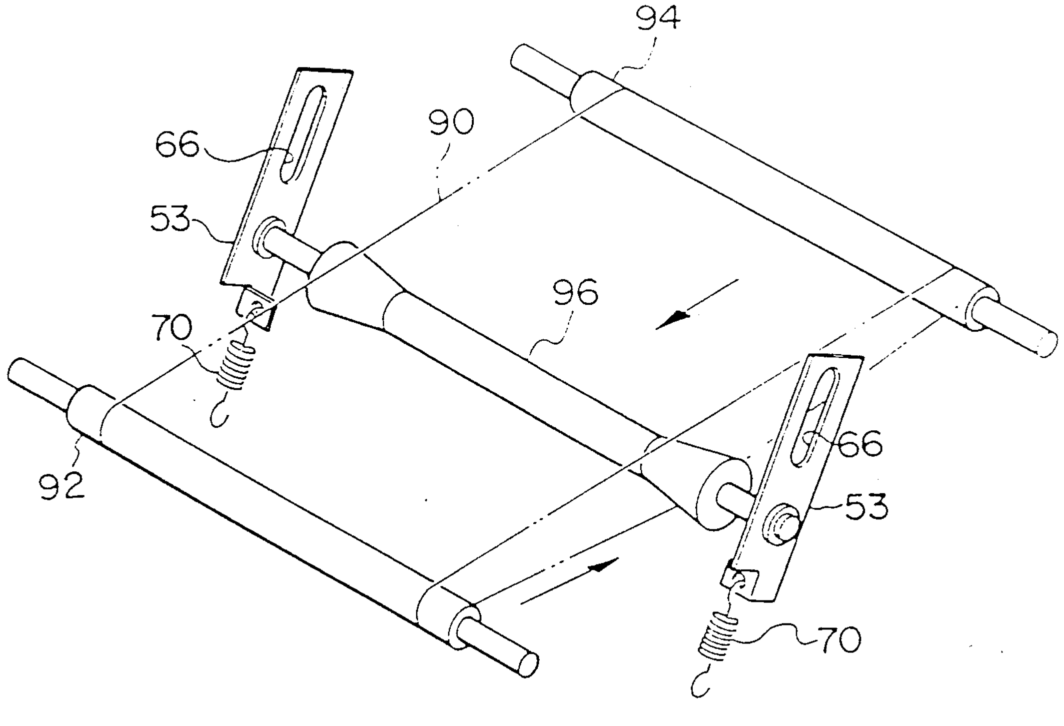
FIG. 4 is a perspective view illustrating a control roller of the belt meandering motion correcting device in accordance with a third embodiment of the present invention.

Although in the foregoing embodiments a description has been given of the case where the belt meandering motion correcting device is applied to the image recording apparatus 10, the present invention is not confined to this arrangement and may also be applied to a belt which is simply wound around a roller or a plurality of rollers. FIG. 4 illustrates a device for preventing the meandering motion of a belt in accordance with a third embodiment of the present invention.

In this embodiment, an endless belt 90 is wound around and stretched between a pair of rollers 92, 94. In addition, a control roller 96 constituting a part of the belt meandering motion correcting device and also serving as a tension balance changing means is rotatably supported at its opposite ends by the pair of movable plates 53 in the same way as the foregoing embodiments and is brought into pressure contact with an inner side of the endless belt 90.

The slide hole 66 is formed in the movable plate 53 and is adapted to move along the slide hole 66 toward the downstream side in the moving direction of the endless belt 90.

In this embodiment as well, when the position of the endless belt 90 in which it is wound around the control roller 96 begins to deviate, the tension of one widthwise side of the endless belt 90 increases, with the result that the movable plate 53 on the side where tension is increased moves along the slide hole 66 toward the downstream side in the moving direction of the endless belt 90.

Consequently, the winding position of the control roller 96 is displaced, and the belt feeding direction is guided in such a manner as to offset the deviating direction, so that the meandering motion of the belt can be corrected automatically.

Figure 5:
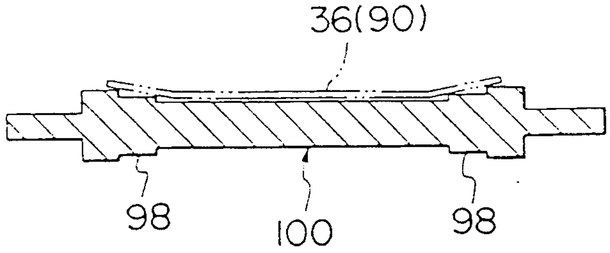
FIG. 5 is a cross-sectional view illustrating another example of the control roller.

Although in the foregoing embodiments the arrangement is such that the control rollers 60, 96 serving as the tension balance changing means and the tension roller 84 are respectively provided with the overall configuration of a spool having truncated cone-shaped side portions, these components are not confined to the same, and it is possible to provide an arrangement as shown in FIG. 5 in which a roller 100 having a pair of stepped side portions 98 whose diameter gradually becomes larger in steps towards each opposite end is used.

Figure 6:
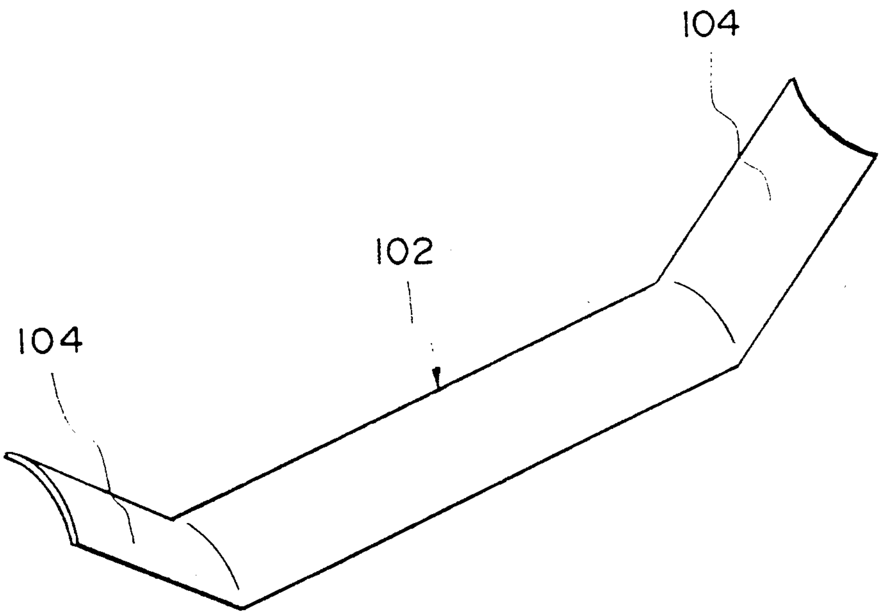
FIG. 6 is a perspective view showing a tabular member for the belt meandering motion correcting device.

Moreover, the arrangement in accordance with the present invention is not confined to the use of the above-described roller, and it is possible to adopt an arrangement in which a tabular member (102) having inclined and curved side portions (104) as shown in FIG. 6 is used in lieu of the control roller (60). It will be understand that the inclined and curved portions have a small coefficient or friction.

In the above-described embodiments, the arrangement is provided such that the tension of one of the offset sides of the belt is made to increase over that of the other side by means of the control rollers 60, 96 and the tension roller 84 which are formed into an overall configuration of a spool having truncated cone-shaped side portions and serve as the tension balance changing means. However, the present invention is not confined to this arrangement, and it is possible to provide an alternative arrangement in which the control rollers and the tension roller serving as the tension balance changing means are formed in such a manner that the diameter of each widthwise side portion thereof becomes gradually smaller toward its end, thereby allowing the tension of one of the offset sides of the belt to decrease below that of the other side. In this case, the side portion of the control roller in the direction of which the deviation takes place moves toward the upstream side in the moving direction of the belt, i.e., the side where tension is increased relatively moves toward the downstream side. As a result, the position of the belt wound around the tension balance changing means is displaced, the belt feeding direction is guided in the opposite direction to the deviating direction, thereby automatically correcting the meandering motion of the belt in the same manner as the above-described embodiments.

Although a similar effect can be obtained if a belt exhibiting a small elongation, i.e., a highly rigid one, is used, a better result can be obtained if a belt which is stretchable to a certain extent is used, since there is an advantage in absorbing creases occurring in the belt itself.

As described above, the belt meandering motion correcting device in accordance with the present invention has excellent advantages in that it is capable of preventing the belt wound around a rotary body such as a roller from deviating from a predetermined course with a simple construction and that high accuracy adjustment can be dispensed with.

What is claimed is:

1. A belt meandering motion correcting device comprising:

a pair of tension balance changing means provided integrally with a control roller and at axial positions of said control roller corresponding to widthwise opposite side portions of a belt so as to be pressed by the tension of said opposite side portions of said belt, constructed with a cylindrical central portion and truncated cone side portions for applying tension to said widthwise opposite side portions of said belt being moved for producing a tension difference between the tension of one side portion of said belt and that of the other side portion of said belt when said belt deviates in a direction toward one side of said tension balance changing means, said control roller being supported at its opposite ends on a pair of movable plates and rotated by the tension of said belt in the moving direction during driving of said belt and displaceable in such a manner that a side thereof where tension is increased by said belt is moved toward the downstream side in the moving direction of said belt more than the other side thereof where tension remains low;

said movable plates supporting said control roller;

a displacement allowing means provided in correspondence with opposite end portions of said control roller, and said displacement allowing means including:

a resilient member connected to an upper end of each movable plate, and stretched when the tension of said side portion of said belt is increased and shrunk when the tension thereof is decreased;

a guide means formed at a lower end portion of said movable plate to guide, during stretching of said resilient member, said end portion of said control roller corresponding to said side portion of said belt toward the downstream side in the moving direction of said belt, and to guide during shrinking of said resilient member said end portion in the opposite direction; and an adjustable screw means mounted on one end of a side plate and one end of said resilient member, being able to adjust the resilient member's tension.

2. A belt meandering motion correcting device according to claim 1, wherein said pair of tension balance changing means each has a stepped surface on the truncated cone side portion for allowing the tension of said side portion of said belt on the deviating side to increase gradually in steps as said belt deviates in the direction toward one side thereof.

3. A belt meandering motion correcting device according to claim 2, wherein said stepped surface is formed annularly on said truncated cone.

4. A belt meandering motion correcting device according to claim 1, wherein said guide means comprises an elongated hole formed in said movable plate and extending in the moving direction of said belt; and a shaft member which is inserted in said elongated hold and is movable in said extending direction, and the direction of movement of said resilient member is different from the direction of pulling said belt.

5. A belt meandering motion correcting device comprising:

a pair of belt tension changing means provided in correspondence with widthwise opposite side portions of said belt and constructed with a tabular central portion and tabular inclined and curved side portions respectively formed at the opposite ends of said central portion for applying tension to said widthwise opposite side portions of said belt being moved so as to increase the tension of one side portion of said belt when said belt deviates in a direction toward one side of said belt tension changing means;

said movable plates supporting said belt tension changing means;

displacement allowing means provided in correspondence with opposite end portions of said belt tension changing means, each said displacement allowing means comprising:

a resilient member connected to an upper end of each movable plate, and stretched when the tension of said side portion of said belt is increased and shrunk when the tension thereof is decreased;

a guide means formed at a lower end portion of said movable plate to guide, during stretching, said end portion of said belt tension changing means corresponding to said side portion of said belt toward the downstream side in the moving direction of said belt, and to guide, during shrinking said end portion in the opposite direction; and an adjustable screw means mounted on one end of a side plate and one end of resilient member, being able to adjust the resilient member's tension.

6. A belt measuring motion correcting device in accordance with claim 5, wherein said tabular central portion and said tabular inclined portion and curved side portions are integrally formed, and inward facing surfaces of said inclined and curved side portions contact both of said side portions of said belt so as to cause the tension of the one of said side portions of said belt on the deviating side to increase continuously as said belt deviates toward one of the sides of said belt tension changing means.

7. A belt meandering motion correcting device comprising:

a pair of belt tension changing means provided in correspondence with widthwise opposite side portions of said belt and constructed with a tabular central portion and tabular inclined and curved side portions respectively formed at the opposite ends of said central portion for applying tension to said widthwise opposite side portions of said belt being moved so as to increase the tension of one side portion of said belt when said belt deviates in a direction toward one side of said belt tension changing means;

a control roller supported at its opposite ends by said pair of movable plates and rotated in the moving direction during driving of said belt by being pressed by the tension of said belt and displaced in such a manner that a side thereof where tension is enhanced by said belt tension enhancing means is moved toward the downstream side in the moving direction of said belt more than the other side thereof, and being operably coupled with said belt tension changing means;

said movable plates supporting said control roller;

displacement allowing means provided in correspondence with opposite end portions of said control roller, each displacement allowing means comprising:

a resilient member connected to an upper end of each movable plate, and stretched when the tension of said side portion of said belt is increased and shrunk when the tension thereof is decreased;

a guide means formed at a lower end portion of said movable plate to guide, during stretching, said end portion of said control roller corresponding to said side portion of said belt toward the downstream side in the moving direction of said belt, and to guide, during shrinking said end portion in the opposite direction; and an adjustable screw means mounted on one end of a side plate and one end of resilient member, being able to adjust the resilient member's tension.

8. A belt meandering motion correcting device in accordance with claim 7, wherein said tabular central portion and said tabular inclined and curved side portions are integrally formed, and inward facing surfaces of said inclined and curved side portions contact both of said side portions of said belt so as to cause the tension of the one of said side portions of said belt on the deviating side to increase continuously as said belt deviates toward one of the sides of said belt changing means.

* * * * *